United States Patent [19]

Cleary et al.

[11] Patent Number: 4,952,663

[45] Date of Patent: Aug. 28, 1990

[54] WHOLLY AROMATIC POLYESTERS WITH REDUCED CHAR CONTENT

[75] Inventors: James W. Cleary, Neenah, Wis.; Richard Layton, Augusta, Ga.

[73] Assignee: Amoco Corporation, Chicago, Ill.

[21] Appl. No.: 208,373

[22] Filed: Jun. 17, 1988

[51] Int. Cl.$^5$ .............................................. C08G 63/60
[52] U.S. Cl. .................................... 528/193; 524/601; 528/179; 528/180
[58] Field of Search ....................... 528/193, 179, 180; 524/601

[56] References Cited

U.S. PATENT DOCUMENTS

| | | |
|---|---|---|
| 3,637,595 | 1/1972 | Cottis et al. . |
| 4,107,143 | 8/1978 | Inata et al. ............................ 528/193 |
| 4,436,894 | 3/1984 | Urasaki et al. ....................... 528/193 |
| 4,447,593 | 5/1984 | Funakoshi et al. .................. 528/193 |
| 4,563,508 | 1/1986 | Cottis et al. . |
| 4,639,504 | 1/1987 | Cottis . |
| 4,742,149 | 5/1988 | Finestone . |

OTHER PUBLICATIONS

Article from *Journal of Applied Polymer Science*, vol. II, Issue No. 5 (1959), pp. 198–202 entitled "Polyesters of Hydroxybenzoic Acids".

*Primary Examiner*—Harold D. Anderson
*Assistant Examiner*—T. Mosley
*Attorney, Agent, or Firm*—Jones, Askew & Lunsford

[57] ABSTRACT

This invention relates to the preparation of wholly aromatic polyesters from monomers having a total ash content of no more than 50 ppm and a total potassium content of no more than 20 ppm. These polyesters have good color and good thermal stability and are essentially free of char material which can lead to unacceptable molded and extruded articles.

29 Claims, No Drawings

WHOLLY AROMATIC POLYESTERS WITH REDUCED CHAR CONTENT

This invention relates to wholly aromatic polyesters. More particularly, this invention relates to wholly aromatic polyesters which are essentially free of undesirable charred particulate matter.

Wholly aromatic polyesters are well known in the prior art, such as Cottis et al. U.S. Pat. No. 3,637,595. Because of their good properties at high temperatures, these polyesters are useful for molding articles which are exposed to high temperatures, such as ovenware. High temperature-resistant fibers and films may also be melt-fabricated from these polyesters.

A particular class of wholly aromatic polyesters which are suitable for molding into ovenware articles are those polyesters made from certain molar amounts of an aromatic dicarboxylic acid component, a hydroxy aromatic carboxylic acid component and an aromatic dihydroxy component. Another suitable class of such polyesters for fibers, films and molded articles are those polyesters where the aromatic dicarboxylic acid component is terephthalic acid or a mixture of terephthalic and isophthalic acids, the hydroxy aromatic carboxylic acid component is p-hydroxybenzoic acid and the aromatic dihydroxy component is 4,4'-biphenol.

As is well known in the art, wholly aromatic polyesters can be produced by various polymerization processes, including suspension and bulk polymerizations. Of these, the bulk polymerization process is perhaps the more desirable in terms of economy. However, since these polyesters have a high melting point as compared to aliphatic polyesters, such as polyethylene terephthalate, a higher temperature is required to maintain the wholly aromatic polyesters in their molten state. Consequently, the resulting materials may be colored and deteriorated in performance.

Processes which utilize solid state polymerization at high temperatures may also lead to colored and deteriorated materials.

As disclosed in Cottis U.S. Pat. No. 4,639,504, a phosphite thermal stabilizer (for example, triphenyl phosphite) may be used to facilitate the manufacture of wholly aromatic polyesters and avoid some disadvantages of prior art processes.

While the phosphite additive leads to desirable enhanced high temperature stability, black particulate charred material is also created. This char is undesirable in ovenware for cosmetic reasons. Unmelted char in extruded products, such as fibers and films, results in weak and less useful products.

The charred material causes problems during further melt processing. These problems include excessive screen pack pressures; plugged spinnerette holes; breaking of filaments during spinning of fibers; and splitting of films during extrusion.

Additionally, as disclosed in Finestone U.S. Pat. No. 4,742,149, a salt (for example, potassium sulfate) can also be used to facilitate the manufacture of wholly aromatic polyesters and avoid some disadvantages of prior art processes.

A critical amount of metal salt added to the polymerization process was found to improve the melt consistency of wholly aromatic polyesters. On the other hand, metals reduce the thermal stability. Metal salts may also be found in the monomers used to produce these polyesters. For example, the p-hydroxybenzoic acid monomer usually contains small but significant amounts of some metals that are considered necessary to make these polyesters. Unless deactivated by the phosphite stabilizer as discussed above, these metals cause thermal degradation of the polyesters.

However, the use of a phosphite stabilizer may lead to the presence of a blackish charred material in the finished polyester. Analytical work shows that this charred material contains a high level of phosphorous. The charred material adversely affects the appearance and processability of these polyesters.

Although the reaction to manufacture wholly aromatic polyesters can proceed without a catalyst, a faster reaction occurs when a catalyst is used, such as magnesium, see Gilkey and Caldwell, Journal of Applied Polymer Science, Volume II, Issue No. 5 (1959), pages 198–202.

Therefore, a need exists for an improved process for the manufacture of wholly aromatic polyesters having good color and good thermal stability, in which such polyesters can be used in melt form to produce articles such as fibers, films and molded articles such as ovenware.

Accordingly, an object of this invention is to provide wholly aromatic polyesters.

Another object of this invention is to provide wholly aromatic polyesters having good color and good thermal stability.

Another object of this invention is to provide such polyesters which can be used in molding compositions suitable for producing ovenware.

Another object of this invention is to provide a process for the manufacture of wholly aromatic polyesters suitable for fibers, films and other extruded products.

Another object of this invention is to provide an improved process for the manufacture of such wholly aromatic polyesters which do not contain any blackish charred material.

Still another object of this invention is to provide an improved process for the manufacture of wholly aromatic polyesters prepared from an aromatic dicarboxylic acid component, a hydroxy aromatic carboxylic acid component and an aromatic dihydroxy component.

Still another object of this invention is to provide an improved process for the manufacture of such wholly aromatic polyesters prepared from terephthalic acid or a mixture of terephthalic and isophthalic acids, p-hydroxybenzoic acid and 4,4'-biphenol.

These and other objects, features and advantages of this invention will become apparent from the following detailed description.

We have surprisingly found that thermally stable, wholly aromatic polyesters having good color and being essentially free of charred material, can be made in an essentially metal-free polymerization process if (1) essentially metal-free monomers are used and (2) a metal-containing catalyst or phosphite stabilizer is either not used or is used in small amounts.

In addition, we have also surprisingly found that small amounts (for example, 10 ppm) of magnesium in the process will accelerate polymerization in the melt and provide a faster transition from liquid to solid, with the resulting wholly aromatic polyesters having good color, good thermal stability and being essentially free of charred material.

Ovenware articles, which are molded from the above polyesters, have good high temperature properties and, therefore, can be used in conventional and microwave ovens.

In accordance with the present invention, wholly aromatic polyesters having good color, good thermal stability, and being essentially free of charred material, are provided by a polymerization process which comprises reacting:

A. an aromatic dicarboxylic acid component;
B. a hydroxy aromatic carboxylic acid component; and
C. an aromatic dihydroxy component;

wherein from 0 to 100 ppm magnesium is used as a catalyst and from 0 to about 0.1 percent by weight, based on the weight of the polyester, of a phosphite is used as a stabilizer; and wherein the monomers used to prepare the wholly aromatic polyesters have a total ash content of no more than 50 ppm and a total potassium content of no more than 20 ppm.

There are commercial sources for p-hydroxybenzoic acid with low ash and low metal contents.

The wholly aromatic polyesters made by the process of this invention can be used in molding compositions to produce useful ovenware articles by conventional injection molding techniques.

The wholly aromatic polyesters useful in this invention have melting temperatures of between about 200° C. and 450° C. and comprise recurring units of ≧ the following formulas:

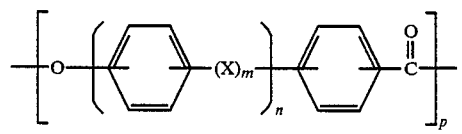

I

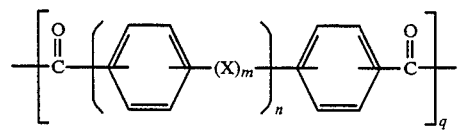

II

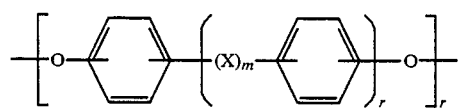

III

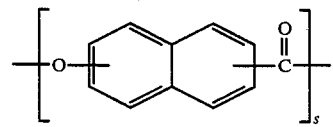

IV

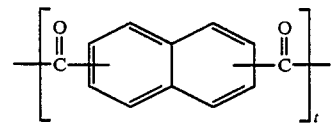

V

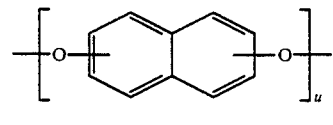

VI where X is —O—, —S—, —CO—, or —SO2—, and m and n are independently zero or one, and the total of the integers p+q+r+s+t+u is from approximately 3 to about 800.

In the most general combination, all of the units of the above formulas can be present in a single polyester. A simple embodiment would be homopolymers of units I or IV.

The preferred location of the functional groups is preferably in the para (1,4) positions. With respect to the naphthalene moiety, the preferred locations of the functional groups are 1,4; 1,5 and 2,6.

The symbols p, q, r, s, t, and u are integers and indicate the number of moieties present in the polyester. The total (p+q+r+s+t+u) can vary from 3 to 800 and, when present, the ratio of q:r, q:u, t:r, t:u, q+t:r, q+t:r+u, and t:r+u, of the moieties can vary from about 10:11 to about 11:10, with the most preferable ratio being 10:10.

Exemplary of monomers from which the moieties of formula I may be obtained are: p-hydroxybenzoic acid, p-acetoxybenzoic acid and isobutyl-p-acetoxybenzoate. Those monomers from which the moiety of formula II may be obtained include terephthalic acid, isophthalic acid, diphenyl terephthalate, diethyl isophthalate, methylethyl terephthalate and the isobutyl half ester of terephthalic acid. Among the monomers from which the moiety of formula III results are: 4,4'-biphenol; p,p'-oxybiphenol; 4'-dihydroxybenzophenone; resorcinol and hydroquinone.

Examples of monomers represented by formula IV are: 4-hydroxy-1-naphthoic acid; 6-hydroxy-2-naphthoic acid; 5-acetoxy-1-naphthoic acid; and phenyl 5-hydroxy-1-naphthoate. Monomers representing formula V include: 1,4-naphthalene dicarboxylic acid; 1,5-naphthalene dicarboxylic acid and 2,6-naphthalene dicarboxylic acid. The diphenyl esters or dicarbonyl chlorides of these acids can also be used. Examples of the monomers representative of the formulas VI are 1,4-dihydroxynaphthalene; 2,6-diacetoxynaphthalene and 1,5-dihydroxynaphthalene.

A preferred class of polyesters have recurring units of formulas VII, VIII, and IX:

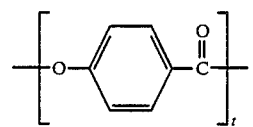

VII

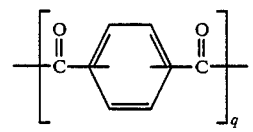

VII

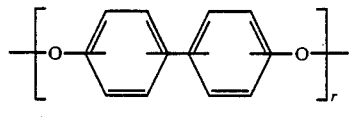

IX wherein the total of the integers p+q+r is about 3 to 800, the carbonyl groups of the moiety of formula VII or VIII are linked to the oxy groups of the moiety of formula VII or IX; and the oxy groups of the moiety of formula VII or IX are linked to the carbonyl groups of the moiety of formula VII or VIII.

The polyesters of this invention comprise the precursor formulas VII, VIII and IX wherein the molar ratios are from 0.01:1:1 to 99:1:1 and preferably from 1:1:1 to 5:1:1.

Each of the three monomer components used to prepare the wholly aromatic polyesters of this invention may be either a single monomer or a mixture of two or more monomers. As examples, the aromatic dicarboxylic acid component can be terephthalic acid or a mixture of terephthalic and isophthalic acids; the hydroxy aromatic carboxylic acid component can be p-hydroxybenzoic acid or a mixture of p-hydroxybenzoic and m-hydroxybenzoic acids; and the aromatic dihydroxy component can be 4,4'-biphenol or a mixture of 4,4'biphenol and hydroquinone.

The wholly aromatic polyesters of this invention are prepared from monomers having a total ash content of no more than 50 ppm and a total potassium content of no more than 20 ppm. Preferably, the total ash content is no more than 20 ppm, and the total potassium content is no more than 10 ppm.

The ash content of the monomers used in this invention is defined as the residue after the organic matter is removed by combustion.

The potassium content of the monomers used in this invention is measured by known analytical methods, such as emission spectroscopy, on the ash.

A preferred class of wholly aromatic polyesters in this invention is prepared from terephthalic acid, p-hydroxybenzoic acid and 4,4'-biphenol in a molar ratio of 1/3.7/1, respectively.

Another preferred class of wholly aromatic polyesters in this invention is made from a mixture of terephthalic and isophthalic acids, p-hydroxybenzoic acid and 4,4'-biphenol in a molar ratio of 1/3/1, respectively, with isophthalic acid comprising about 25% of the acid mixture.

Methods for the synthesis of these wholly aromatic polyesters are described in Cottis et al. U.S. Pat. No. 3,637,595; Cottis et al. U.S. Pat. No. 4,563,508; and Cottis U.S. Pat. No. 4,639,504; and Finestone U.S. Pat. No. 4,742,149; the disclosures of which are incorporated herein by reference.

The terms Compressive Flow, Thermal Stability and Color used in this application are defined as follows:

Thermal Stability (TS) refers to the thermal stability of the polyester, and the TS values are measured by the following procedure:

1. The sample is ground to pass through a 2 mm screen.

2. The ground sample and an equal amount of ground material from a control batch are heated in an air oven at 400° C. for 16 hours.

3. The weight loss of the test sample and the control sample are measured, and the TS value of the test sample is calculated by means of the following formula:

$$TS\ value = \frac{\log\left(1 - \frac{\text{wt. loss of test sample}}{\text{wt. of polyester in test sample}}\right)}{\log\left(1 - \frac{\text{wt. loss of control sample}}{\text{wt. of polyester in control sample}}\right)}$$

If the TS value is larger than one, the sample is less thermally stable than the control. If the TS value is smaller than one, the sample is more thermally stable than the control. The TS values in this application are provided for comparison purposes.

Compressive Flow (CF) is a measure of the flow of a weighed sample when pressed on a Carver press at 5000 pounds. CF is measured from the area of a disc obtained from a sample of powdered material of given weight, usually 0.5 to 1.0 grams, which has been pressed between two parallel plates. In carrying out the determination of this characteristic, a sample is pressed between two sheets of aluminum foil which in turn are backed by chromium plated steel plates $6'' \times 6'' \times \frac{1}{4}''$. A Carver 2112-X Model No. 150-C hydraulic press modified for 800° F. is used to press the sample. The particular temperature of the press is that indicted in each sample run. The sample material is allowed to stand for five minutes between the plates at holding pressure in order that the temperature of the material can equilibrate with the press temperature. A load of 5000 pounds is then applied for two minutes. The CF is then calculated on the following basis. The area of the pressed molding compound is measured by cutting an aluminum sandwich out of the sample pressed between the two aluminum foil sheets. The aluminum foil has a known area/weight relationship called the foil factor. The area is normalized for the pressure of the applied load and that number is multiplied by 100 to give a number greater than 1. The compressive flow is then calculated by means of the following equation:

$$CF = \left[\frac{\left|\frac{\text{Wt. of circle (sandwich)} - \text{wt. of sample}}{\text{Foil wt. factor}} \times 50\right|^2}{\text{Applied load (Kg)} \times \text{wt. of sample}}\right] \times 100$$

The wholly aromatic polyesters of this invention have a CF value of at least 20 when measured at the anticipated processing temperature.

The color values of the wholly aromatic polyesters of this invention are determined by visual comparisons to a standard, with overall range of color being from 1–10. A color value of 1 indicates that the polyester sample has the most acceptable color value. A color value of 10 indicates that the polyester sample is very dark in color.

The wholly aromatic polyesters of this invention have color values of no more than 3.

However, color values are not tied strictly to the char content of these polyesters.

While our wholly aromatic polyesters may have overall good color, there may be a small amount of black particles (char) within the polyesters. These particles do not affect the color value but will affect the appearance of products produced from the polyesters.

This invention is further illustrated by the following examples which are illustrative of certain embodiments designed to teach those of ordinary skill in this art how to practice this invention and to represent the best mode contemplated for carrying out this invention.

With the exception of Example 1, the following examples show the preparation of wholly aromatic polyesters from monomers having a total ash content of no more than 50 ppm and a total potassium content of no more than 20 ppm.

EXAMPLES 1–2

The wholly aromatic polyesters of Examples 1–2 are prepared according to the following procedure.

A mixture of:

| 524.8 g (3.159 moles) | terephthalic acid |
| 174.9 g (1.053 moles) | isophthalic acid |
| 1745.3 g (12.637 moles) | 4-hydroxybenzoic acid |
| 784.3 g (4.211 moles) | 4,4'-biphenol |
| 2471.1 g (24.205 moles) | acetic anhydride | is placed in a 5 liter glass flask equipped with a distillation head and stirrer. The mixture is heated under reflux with stirring for three hours. The temperature of the mixture is increased at a rate of 30° C. per hour with removal of distillate until the mixture reaches 310° C. The mixture is held about this temperature until distillation almost stops and the mixture begins to thicken. The mixture is quenched by being poured in thin sheets into large pans.

The prepolymer is ground, and a portion is heated under nitrogen in a rotating drum in an oven at a programmed heating rate with a final hold at 282° C. for 4.0 hours.

The polymer of Example 1 is made with a high ash (194 ppm) 4-hydroxybenzoic acid that contains 61 ppm potassium and 5 ppm sodium. The polymer should contain 37 ppm potassium from this material. Magnesium acetate tetrahydrate, 2.52 g (885 ppm), is added with the monomers. When the melt reaches 277° C., 2.28 g (800 ppm) of triphenylphosphite is injected.

A large amount of charred black material forms immediately and slowly disperses into the melt as large black specs which are visibly present in the finished polymer.

The polymer of Example 2 is made with a low ash (9 ppm) and low potassium (3 ppm) p-hydroxybenzoic acid, without any additives. This polymer is free of black material.

| Example | Color | CF at 330° C. | TS |
|---|---|---|---|
| 1 | good | 78 | 0.56 |
| 2 | good | 91 | 0.59 |

The properties of the polymers of Examples 1 and 2 are about the same. Of special note is the thermal stability. The polymer of this invention (Example 2) is as stable as the control polymer (Example 1) even when no thermal stabilizer has been added.

EXAMPLE 3

A mixture of:

| 2.947 Kg | terephthalic acid |
| 0.982 Kg | isophthalic acid |
| 9.799 Kg | 4-hydroxybenzoic acid (low-ash) |
| 4.403 Kg | 4,4'-biphenol |
| 13.882 Kg | acetic anhydride | is placed in a 15 gallon reactor and heated under reflux with stirring for three hours. Then the temperature is increased at a rate of 30° C. per hour until the melt reaches 313° C. The melt is poured into a two arm mechanical mixer and mixed at 288° C. for 6.5 hours. The polymer has a thermal stability of 0.76, good color and no black char particles.

EXAMPLE 4

A mixture of:

| 622.4 g | terephthalic acid |
| 1914.9 g | 4-hydroxybenzoic acid (low ash) |
| 698.0 g | 4,4'-biphenol |
| 2508.0 g | acetic anhydride | is placed in a 5 liter glass flask equipped with a distillation head and a mechanical stirrer. The mixture is heated under reflux with stirring for three hours. Then the temperature of the mixture is raised at a rate of 30° C. per hour until the melt reaches 310° C. The melt is held near this temperature until the melt begins to thicken and distillation almost ceases. The melt is quenched by pouring into pans. The prepolymer is ground, and a portion is advanced by heating under nitrogen in a rotating drum in an oven with a programmed heating cycle with a final hold at 330° C. for 2.0 hours.

The advanced polymers have very good color, and thermal stability is acceptable. These polymers have no black char particles.

EXAMPLES 5-9

The wholly aromatic polyesters of Examples 5-9 are prepared according to the following procedure.

A mixture of:

| 524.8 g (3.159 moles) | terephthalic acid |
| 174.9 g (1.053 moles) | isophthalic acid |
| 1745.3 g (12.637 moles) | 4-hydroxybenzoic acid |
| 784.3 g (4.211 moles) | 4,4'-biphenol |
| 2471.1 g (24.205 moles) | acetic anhydride | and variable amounts of magnesium acetate tetrahydrate is heated under reflux with stirring for three hours. The temperature of the mixture is increased at a rate of 30° C. per hour with removal of distillate until the mixture reaches 310° C. The mixture is held near this temperature until distillation almost stops, and the melt begins to thicken. The mixture is quenched by being poured in thin sheets into large pans. When cool, the prepolymer is ground and a portion is heated under nitrogen in a rotating drum in an oven at a programmed heating rate with a final hold at 282° C. for 4.0 hours.

Polymers are made with 0 to 1.26 g (0 to 443 ppm) of magnesium acetate tetrahydrate so that the polymerization systems would contain 0 to 50 ppm Mg. Evolution of distillate is enhanced by the presence of magnesium.

The polymers containing magnesium advance a little slower than the polymer of Example 5. All thermal stabilities are acceptable, and the color of each polymer is very good.

| Example | Mg ppm | Color | CF at 330° C. | TS |
|---|---|---|---|---|
| 5 | 0 | 1 | 91 | 0.59 |
| 6 | 5 | 1 | 102 | 0.95 |
| 7 | 10 | 1 | 106 | 0.70 |
| 8 | 25 | 1 | 137 | 0.68 |
| 9 | 50 | 1 | 116 | 0.66 |

EXAMPLES 10-12

The wholly aromatic polyesters of Examples 10-12 are prepared according to the following procedure.

A mixture of:

| | | |
|---|---|---|
| 2.947 | Kg | terephthalic acid |
| 0.982 | Kg | isophthalic acid |
| 9.799 | Kg | 4-hydroxybenzoic acid (low ash) |
| 4.403 | Kg | 4,4'-biphenol |
| 13.882 | Kg | acetic anhydride |
| 0 or 1.416 | g | magnesium acetate tetrahydrate | is placed in a 15 gallon reactor and heated under reflux with stirring for three hours. Then the temperature is increased at a rate of 30° C. per hour until the melt reaches 313° C. The melt is poured into a two arm mechanical mixer and mixed at an elevated temperature the required period of time. The polyesters of Examples 6–8 have no black particles.

| Example | Mg ppm | TS | Mixer °C. | Hrs. | CF at 330° C. |
|---|---|---|---|---|---|
| 6 | 0 | 0.76 | 288 | 6.5 | 282 |
| 7 | 10 | 0.90 | 288 | 6.5 | 168 |
| 8 | 10 | 0.88 | 293 | 5.0 | 132 |

EXAMPLE 13

A mixture of:

| | | |
|---|---|---|
| 184 | lb | terephthalic acid |
| 61 | lb | isophthalic acid |
| 612 | lb | 4-hydroxybenzoic acid (low ash) |
| 275 | lb | 4,4-biphenol |
| 868 | lb | acetic anhydride |
| 40.1 | grams (88.5 ppm) | magnesium acetate tetrahydrate | is placed in a 325 gallon reactor and heated with stirring until distillation starts. The reactor is held at this temperature for three hours. Distillation is started, and the temperature increased until 400 lb of distillate has been collected. The contents are pressured into a 200 gallon reactor and the temperature is increased at a rate of 30° C. per hour until the contents reaches 313° C. Then the contents are poured into a two arm mechanical mixer and mixed at an elevated temperature for 5 hours. Six batches of polymers are made with compressive flows at 330° C. from 55 to 74, and each polymer has very good color.

A blend of 52 parts of the six polymers, 28 parts talc and 20 parts fiberglass is compounded and pelletized. The compound is injection molded, and the moldings have excellent flexural strength, flexural modulus and heat deflection temperatures.

EXAMPLES 14–22

The wholly aromatic polyesters of Examples 14–22 are prepared according to the following procedure.
A mixture of:

| | | |
|---|---|---|
| 622.4 | g | terephthalic acid |
| 1,914.9 | g | 4-hydroxybenzoic acid (low ash) |
| 698.0 | g | 4,4'-biphenol |
| 2508.0 | g | acetic anhydride |
| 0 to 2.52 | g | magnesium acetate tetrahydrate | is placed in a 5 liter glass flask equipped with a distillation head and a mechanical stirrer. The mixture is heated under reflux with stirring for three hours. Then the temperature of the mixture is raised at a rate of 30° C. per hour until the melt reaches 310° C. The melt is held near this temperature until the melt begins to thicken and distillation almost ceases. The melt is quenched by pouring into pans. The prepolymer is ground, and a portion is advanced by heating under nitrogen in a rotating drum in an oven with a programmed heating cycle with a final hold at 330° C. for 2.0 hours.

The evolution of distillate is enhanced by the presence of magnesium.

All advanced polymers have very good color, compressive flows at 385° C. between 59 and 94, and thermal stability values mostly between 1.14 and 1.40. The polymer of Example 14 was not tested for a CF value at 385° C.

| Example | Mg ppm | Color | CF at 385° | CF at 404° | TS |
|---|---|---|---|---|---|
| 14 | 0 | 1 | — | 146 | 1.32 |
| 15 | 5 | 1 | 59 | 151 | 1.25 |
| 16 | 10 | 1 | 62 | 156 | 1.38 |
| 17 | 15 | 1 | 73 | 218 | 1.30 |
| 18 | 20 | 1 | 71 | 234 | 1.84 |
| 19 | 25 | 1 | 66 | 263 | 1.59 |
| 20 | 50 | 1 | 94 | 309 | 1.13 |
| 21 | 75 | 1 | 75 | 298 | 1.14 |
| 22 | 100 | 1 | 66 | 321 | 1.40 |

EXAMPLES 23–29

The wholly aromatic polyesters of Examples 23–29 are prepared according to the following procedure.
A mixture of:

| | | |
|---|---|---|
| 524.8 | g | terephthalic acid |
| 174.9 | g | isophthalic acid |
| 1745.3 | g | 4-hydroxybenzoic acid |
| 784.3 | g | 4,4-biphenol |
| 2472.5 | g | acetic anhydride |
| 0.252 | g | magnesium acetate tetrahydrate |
| 0 to 1.71 | g | Weston 618 (distearyl pentaerythritol diphosphite) | is placed in a 5 liter glass flask equipped with a distillation head and a mechanical stirrer. The mixture is heated under reflux for three hours and then the temperature is raised at a rate of 30° C. per hour until the melt reaches 310° C. The system is held as this temperature until distillation almost stops and the melt begins to thicken. The prepolymer is poured into large pans, cooled and ground. A portion is heated at an elevated temperature under nitrogen in a rotating drum in an oven.

The thermal stability of the polymers improves with the increase of amount of phosphite, while there is little difference between the polymers for compressive flows at 330° C.

| Example | % Weston 618 | Color | CF at 330° C. | TS |
|---|---|---|---|---|
| 23 | 0 | 1 | 106 | 0.70 |
| 24 | 0.01 | 1 | 130 | 0.73 |
| 25 | 0.02 | 1 | 141 | 0.58 |
| 26 | 0.03 | 1 | 131 | 0.49 |
| 27 | 0.04 | 1 | 107 | 0.57 |
| 28 | 0.05 | 1 | 113 | 0.48 |
| 29 | 0.06 | 1 | 128 | 0.49 |

EXAMPLES 30-33

The wholly aromatic polyesters of Examples 30-33 are prepared according to the following procedure.

A mixture of:

| | |
|---|---|
| 1.946 kg | terephthalic acid |
| 0.9822 kg | isophthalic acid |
| 9.7987 kg | 4-hydroxybenzoic acid (low ash) |
| 4.4032 kg | 4,4'-biphenol |
| 13.8819 kg | acetic anhydride |
| 1.416 g | magnesium acetate tetrahydrate |
| 0 to 1.6 g | Weston 618 (distearyl pentaerythritol diphosphite) | is placed in a 15 gallon reactor and heated under reflux with stirring for 3 hours. Then the temperature is raised at a rate of 30° C. per hour until the melt reaches 313° C. The melt is poured into a two arm mechanical mixer and mixed at an elevated temperature for 6.5 hours.

In Example 30, no phosphite is added. In Examples 31 and 32, small amounts of a phosphite, Weston 618, is added with the monomers. In Example 33, 1.6 g of Weston 618 is injected into the melt when the melt reaches 220° C.

The thermal stability of polymers of Examples 32 and 33 are much better than those of Examples 30 and 31.

| Example | TS | % Weston 618 | Color | CF at 330° C. |
|---|---|---|---|---|
| 30 | 1.41 | 0 | acceptable | 71 |
| 31 | 1.46 | 0.005 | acceptable | 78 |
| 32 | 0.73 | 0.01 | acceptable | 159 |
| 33 | 0.91 | 0.01 | acceptable | 147 |

EXAMPLES 34-36

The wholly aromatic polyesters of Examples 34-36 are prepared according to the following procedure.

A mixture of:

| | |
|---|---|
| 622.4 g | terephthalic acid |
| 1914.9 g | 4-hydroxybenzoic acid (low ash) |
| 698.0 g | 4,4'-biphenol |
| 2508.0 g | acetic anhydride | is placed in a 5 liter glass flask equipped with a distillation head and a mechanical stirrer. The mixture is heated under reflux with stirring for three hours, and the temperature of the mixture is then raised at a rate of 30° C. per hour until the melt reaches 305° C. A phosphite, 0 to 1.25 g of Weston 618, is injected into the melt. Heating is continued until the melt reaches 310° C. The melt is held near this temperature until the melt begins to thicken and distillation almost ceases. The melt is quenched by pouring into pans. The prepolymer is ground, and a portion is advanced by heating under nitrogen in a rotating drum in an oven with a programmed heating cycle with a final hold at 330° C. for 2.0 hours.

All polymers have very good color and compressive flows at 404° C. between 127 and 146.

| Example | TS | % Weston 618 | Color | CF at 404° C. |
|---|---|---|---|---|
| 34 | 1.32 | 0 | 1 | 146 |
| 35 | 0.95 | 0.022 | 1 | 139 |
| 36 | 1.08 | 0.044 | 1 | 127 |

The foregoing description relates to certain embodiments of this invention, and modifications or alterations may be made without departing from the spirit and scope of this invention as set forth in the claims.

We claim:

1. A wholly aromatic polyester which is essentially free of charred material, has good color and good thermal stability, and which comprises recurring units derived from the reaction of:
   a. an aromatic dicarboxylic acid component;
   b. a hydroxy aromatic carboxylic acid component; and
   c. an aromatic dihydroxy component;
   wherein from about 0 to about 100 ppm magnesium is used as the reaction catalyst and from 0 to about 0.1 percent, by weight, based on the weight of the polyester, of a phosphite is used as a stabilizer; and wherein monomers used to prepare the wholly aromatic polyester have a total ash content of no more than 50 ppm and a total potassium content of no more than 20 ppm.

2. A wholly aromatic polyester as defined by claim 1 wherein the aromatic dicarboxylic acid component is terephthalic acid.

3. A wholly aromatic polyester as defined by claim 1 wherein the aromatic dicarboxylic acid component is a mixture of terephthalic and isophthalic acids.

4. A wholly aromatic polyester as defined by claim 3 wherein isophthalic acid comprises about 25 percent of the mixture.

5. A wholly aromatic polyester as defined by claim 1 wherein the hydroxy aromatic carboxylic acid component is p-hydroxybenzoic acid.

6. A wholly aromatic polyester as defined by claim 1 wherein the aromatic dihydroxy component is 4,4'-biphenol.

7. A wholly aromatic polyester as defined by claim 1 wherein the magnesium catalyst is magnesium acetate tetrahydrate.

8. A wholly aromatic polyester as defined by claim 1 wherein the phosphite stabilizer is triphenyl phosphite.

9. A wholly aromatic polyester as defined by claim 1 wherein the phosphite stabilizer is distearyl pentaerythritol diphosphite.

10. A wholly aromatic polyester as defined by claim 1 wherein the monomers have a total ash content of no more than 20 ppm and a total potassium content of no more than 10 ppm.

11. An ovenware article molded from a composition comprising a wholly aromatic polyester as defined by claim 1.

12. A fiber made from a composition comprising a wholly aromatic polyester as defined by claim 1.

13. A film made from a composition comprising a wholly aromatic polyester as defined by claim 1.

14. A process for the manufacture of wholly aromatic polyesters which are essentially free of charred material and which have good color and good thermal stability, wherein the process comprises the reaction of:

a. an aromatic dicarboxylic acid component;
b. a hydroxy aromatic carboxylic acid component; and
c. an aromatic dihydroxy component;
wherein from 0 to about 100 ppm magnesium is used as a catalyst and from 0 to about 0.1 percent by weight, based on the weight of the polyester, of a phosphite is used as a stabilizer; and
wherein monomers have a total ash content of no more than 50 ppm and a total potassium content of no more than 20 ppm.

15. A process as defined by claim 14 wherein the aromatic dicarboxylic acid component is terephthalic acid.

16. A process as defined by claim 14 wherein the aromatic dicarboxylic acid component is a mixture of terephthalic and isophthalic acids.

17. A process as defined by claim 16 wherein isophthalic acid comprises about 25 percent of the mixture.

18. A process as defined by claim 14 wherein the hydroxy aromatic carboxylic acid component is p-hydroxybenzoic acid.

19. A process as defined by claim 14 where the aromatic dihydroxy component is 4,4'-biphenol.

20. A process as defined by claim 14 wherein the magnesium catalyst is magnesium acetate tetrahydrate.

21. A process as defined by claim 14 wherein the phosphite stabilizer is triphenyl phosphite.

22. A process as defined by claim 14 wherein the phosphite stabilizer is distearyl pentaerythritol diphosphite.

23. A process as defined by claim 14 wherein the monomers have a total ash content of no more than 20 ppm and a total potassium content of no more than 10 ppm.

24. An ovenware article molded from a composition comprising a wholly aromatic polyester prepared according to a process as defined by claim 14.

25. A fiber made from a composition comprising a wholly aromatic polyester prepared according to a process as defined by claim 14.

26. A film made from a composition comprising a wholly aromatic polyester prepared according to a process as defined by claim 14.

27. A wholly aromatic polyester which is essentially free of charred material, has good color and good thermal stability, and which comprises recurring units derived from the reaction of:
a. terephthalic acid;
b. p-hydroxybenzoic acid; and
c. 4,4'-biphenol;
wherein from about 0 to about 100 ppm magnesium is used as the reaction catalyst and from 0 to about 0.1 percent, by weight, based on the weight of the polyester, of a phosphite is used as a stabilizer; and
wherein monomers used to prepare the wholly aromatic polyester have a total ash content of no more than 50 ppm and a total potassium content of no more than 20 ppm.

28. A wholly aromatic polyester which is essentially free of charred material, has good color and good thermal stability, and which comprises recurring units derived from the reaction of:
a. a mixture of terephthalic and isophthalic acids;
b. p-hydroxybenzoic acid; and
c. 4,4'-biphenol;
wherein from about 0 to about 100 ppm magnesium is used as the reaction catalyst and from 0 to about 0.1 percent, by weight, based on the weight of the polyester, of a phosphite is used as a stabilizer; and
wherein monomers used to prepare the wholly aromatic polyester have a total ash content of no more than 50 ppm and a total potassium content of no more than 20 ppm.

29. A wholly aromatic polyester which is essentially free of charred material, has good color and good thermal stability, and which comprises recurring units derived from the reaction of:
a. an aromatic dicarboxylic acid component;
b. a hydroxy aromatic carboxylic acid component; and
c. an aromatic dihydroxy component;
wherein the reaction proceeds without the use of magnesium as a reaction catalyst and without the use of a phosphite as a stabilizer; and
wherein monomers used to prepare the wholly aromatic polyester have a total ash content of no more than 50 ppm and a total potassium content of no more than 20 ppm.

* * * * *

UNITED STATES PATENT AND TRADEMARK OFFICE
CERTIFICATE OF CORRECTION

PATENT NO. : 4,952,663

DATED : August 28, 1990

INVENTOR(S) : James W. Cleary and Richard Layton

It is certified that error appears in the above-identified patent and that said Letters Patent is hereby corrected as shown below:

| Col. | Line | |
|---|---|---|
| 3 | 46 | "(X)$m$" should read --X$m$--. |
| 3 | 48 | 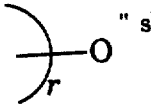 |
| 4 | 48 | 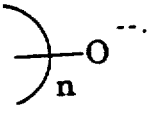 |
| 4 | 50 | "VII" should read --VIII--. |
| 3 | 29 | "of ≳ the" should read --of one or more of the--. |

Signed and Sealed this

Fourth Day of February, 1992

Attest:

HARRY F. MANBECK, JR.

Attesting Officer       Commissioner of Patents and Trademarks